United States Patent
Cumming

(10) Patent No.: US 7,426,033 B2
(45) Date of Patent: *Sep. 16, 2008

(54) METHODS AND APPARATUS FOR COLORIMETRICALLY CHARACTERIZING COLOR DEVIATION IN COLOR IMAGING DEVICES

(75) Inventor: Darren Cumming, San Francisco, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 11/748,277

(22) Filed: May 14, 2007

(65) Prior Publication Data

US 2007/0211275 A1 Sep. 13, 2007

Related U.S. Application Data

(63) Continuation of application No. 10/744,207, filed on Dec. 22, 2003, now Pat. No. 7,233,397.

(51) Int. Cl.
G01J 3/46 (2006.01)
(52) U.S. Cl. .................. 356/402; 356/421

(58) Field of Classification Search ............... 356/402, 356/319; 250/252.1; 702/85; 347/19; 358/504
See application file for complete search history.

(56) References Cited

U.S. PATENT DOCUMENTS

| 5,182,721 | A |   | 1/1993 | Kipphan et al. |
|---|---|---|---|---|
| 5,416,613 | A |   | 5/1995 | Rolleston et al. |
| 6,027,201 | A | * | 2/2000 | Edge ............... 347/19 |
| 6,141,120 | A | * | 10/2000 | Falk ............... 358/504 |
| 6,441,923 | B1 |   | 8/2002 | Balasubramanian et al. |
| 6,469,804 | B1 |   | 10/2002 | Ott et al. |
| 6,628,826 | B1 |   | 9/2003 | Gilman et al. |
| 6,802,254 | B2 |   | 10/2004 | Brydges et al. |
| 2002/0118976 | A1 |   | 8/2002 | Fischer |
| 2003/0058447 | A1 |   | 3/2003 | Yamada et al. |

FOREIGN PATENT DOCUMENTS

| EP | 1 083 739 | * | 3/2001 |
|---|---|---|---|
| EP | 1083739 A2 |   | 3/2001 |
| WO | PCT/US2004/040265 |   | 3/2005 |

* cited by examiner

*Primary Examiner*—Kara E Geisel
(74) *Attorney, Agent, or Firm*—James Trosino

(57) ABSTRACT

Methods and apparatus are provided that print a set of similar color patches using a color output device, determine colorimetric values for each color patch, calculate a standard deviation value for each of the colorimetric values, and calculate a numerical value that is a function of the standard deviation values and that represents the colorimetric deviation of the set.

28 Claims, 4 Drawing Sheets

FIG. 5

METHODS AND APPARATUS FOR COLORIMETRICALLY CHARACTERIZING COLOR DEVIATION IN COLOR IMAGING DEVICES

REFERENCE TO RELATED APPLICATIONS

This application is a continuation of U.S. patent application Ser. No. 10/744,207, filed 22 December 2003, now U.S. Pat. No. 7,233,397.

BACKGROUND

This invention relates to color imaging devices. More particularly, this invention pertains to methods and apparatus for calorimetrically characterizing color deviation in color imaging devices.

Color imaging devices, such as color copiers, color printers, color printing presses and other similar color imaging devices often exhibit visible color variations in their printed output. These visible variations may occur within a single page (spatial page variations), and also from page to page (page-to-page variations), even though the input to the imaging device is identical for each page. This phenomenon is often referred to as "engine drift," or "engine instability," and may result from variations in manufacturing tolerances or aging of the imaging device, time-dependent variations in the colorants used to form the image (e.g., toner or ink), and variations in the ambient environment of the device.

Although engine drift and engine instability have been recognized for some time, there has not been an objective technique to characterize this phenomenon that correlates well with the visually perceived phenomenon. Indeed, previously known techniques for characterizing engine drift have often been based on density measurements. In one such previously known technique, a color imaging device is used to print a test pattern that includes test patches, which are then measured using a densitometer or other similar device that provides measurements of reflected density. After obtaining a large number of measurements (i.e., from multiple locations within a page and from multiple pages) the measured density values are averaged, and a standard deviation measurement is calculated from the measured data.

Although such previously known density-based techniques may be used to characterize engine drift, the techniques are not useful indicators of human perception of engine drift. In particular, density measurements do not correlate well with human perception of color, and density-based indicators of color variation do not correlate well with human perception of color differences. As a result, previously known density-based techniques for characterizing engine drift do not bear a close relationship to how a human observer would perceive such engine drift.

It therefore would be desirable to provide methods and apparatus for objectively characterizing color variations in a color output device.

It further would be desirable to provide methods and apparatus for characterizing color variations in a color output device in a manner that corresponds to human perception of such variations.

SUMMARY

Methods and apparatus in accordance with this invention print a set of similar color patches using a color output device, determine calorimetric values for each color patch, calculate a standard deviation value for each of the calorimetric values, and calculate a numerical value that is a function of the standard deviation values and that represents the colorimetric deviation of the set.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which:

FIG. 5 is a diagram of an alternative exemplary test pattern for use with systems and methods in accordance with this invention.

DETAILED DESCRIPTION

Figure 1:
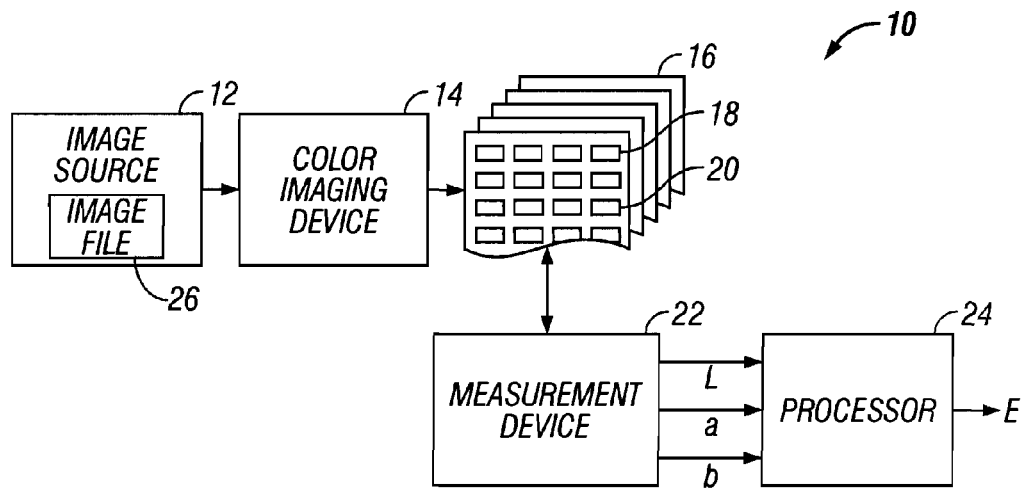
FIG. 1 is a block diagram of an exemplary system in accordance with this invention.

Referring to FIG. 1, an exemplary system for characterizing color variations in a color output device in accordance with this invention is described. System 10 includes image source 12, color imaging device 14, output pages 16, measurement device 22 and processor 24. Image source 12 includes image file 26, which includes digital data representing a test pattern 18 to be printed by color imaging device 14. Image source 12 may be a personal computer, laptop computer, handheld computer, computer workstation, print server, personal digital assistant, or any other similar device that may be used to provide image files for printing by color imaging devices.

Image source 12 may include a software application (not shown) used to generate image file 26. For example, image source 12 may be a personal computer that includes Adobe PageMaker software that may be used to generate image file 26. Image file 26 may be a digital data file that describes test pattern 18 in a page description language, such as PostScript, PCL, or other similar page description language, or may simply be a raster image, such as a TIFF image, RAW image, or other similar raster image. Color imaging device 14 may be a color printer, color copier, printing press, or other similar color imaging device that uses one or more colorants to provide output pages 16 including test pattern 18. For example, color imaging device 14 may be a color printer that uses cyan ("C"), magenta ("M"), yellow ("Y") and black ("K") colorants. Test pattern 18 includes one or more color patches 20.

Measurement device 22 may be any conventional measurement device that may be used to provide calorimetric data that describes a printed sample, such as a calorimeter, spectrophotometer, spectrocolorimeter, or other similar device. For example, measurement device 22 may be a Spectrolino spectrophotometer manufactured by GretagMacbeth LLC, New Windsor, N.Y. Measurement device 22 provides colorimetric data, such as CIE LAB data (referred to herein as "LAB data") CIE XYZ data (referred to herein as "XYZ data"), CIE LUV data (referred to herein as "LUV data"), CIE LCH data (referred to herein as "LCH data"), or other similar calorimetric data that describes printed samples, such as color patches 20. Processor 24 may be a personal computer, laptop computer, handheld computer, computer workstation, print server, personal digital assistant, or any other similar device that may be used to receive colorimetric data, such as LAB data (i.e., L, a and b values), LUV data (i.e., L, u and v values), LCH data (i.e., L, C and H values), or other similar colorimetric data from measurement device 22 and generate therefrom numerical values that characterize color variations in a color output device in accordance with this invention. Persons of ordinary skill in the art will understand that the functions of processor 24 may be implemented by image source 12.

Figure 2:
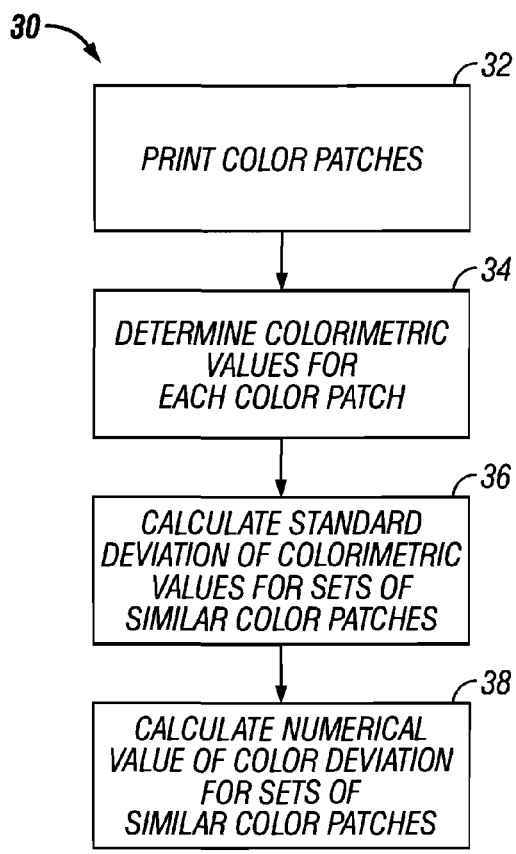
FIG. 2 is a flowchart of an exemplary method in accordance with this invention.

Referring now to FIGS. 1 and 2, an exemplary method 30 for characterizing color variations in a color output device in accordance with this invention is described. At step 32, color imaging device 14 is used to print test pattern 18 of one or more color patches 20 on one or more output pages 16. For example, a user of image source 12 may issue a print command to print multiple copies of image file 26 on color imaging device 14. At step 34, colorimetric values are determined for each color patch 20. For example, measurement device 22 may be used to determine LAB data for each color patch 20 on each of the output pages 16.

Figure 3:
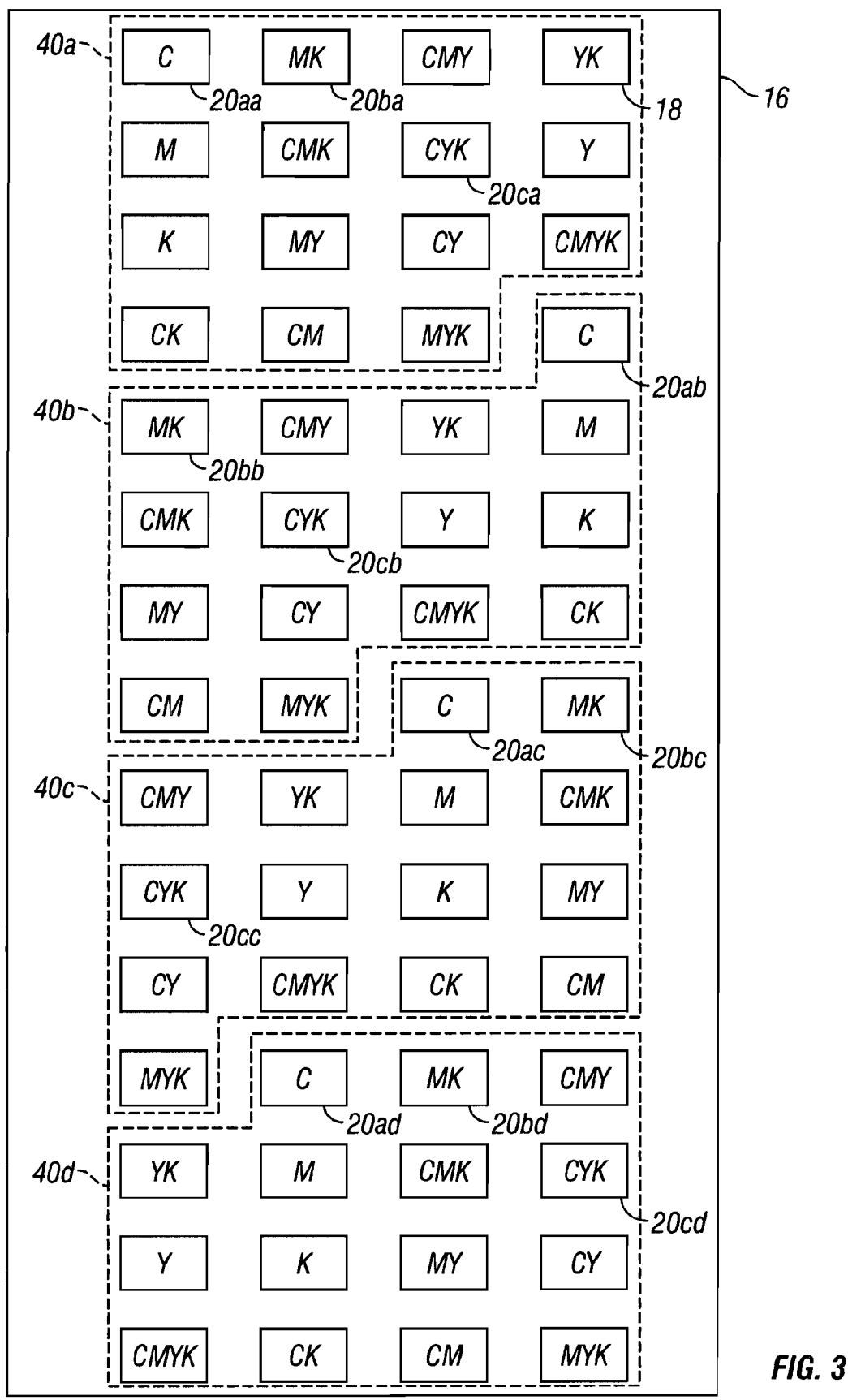
FIG. 3 is a diagram of an exemplary test pattern for use with systems and methods in accordance with this invention.

Referring now to FIG. 3, an exemplary output page 16 including exemplary test pattern 18 is described. Test pattern 18 includes one or more regions 40, with each region including one or more color patches 20. As shown in FIG. 3, test pattern 18 includes four regions 40a-40d, with each region including fifteen color patches 20. Persons of ordinary skill in the art will understand that test pattern 18 may include more or less than four regions 40, and each region may include more or less than 15 color patches 20. Each color patch 20 is comprised of a corresponding specified percentage of the colorants used by color imaging device 14 (e.g., C, M, Y and K). For example, color patches 20aa, 20ab, 20ac and 20ad may be comprised of 100% C. and 0% M, 0% Y and 0% K, color patches 20ba, 20bb, 20bc and 20bd may be comprised of 0% C, 100% M, 0% Y and 100% K, and color patches 20ca, 20cb, 20cc and 20cd may be comprised of 100% C, 0% M, 100% Y and 100% K. Persons of ordinary skill in the art will understand that other percentages of colorants also may be used for color patches 20.

Each output page 16 may include multiple similar color patches 20 distributed throughout test pattern 18. For example, color patches 20aa, 20ab, 20ac and 20ad in regions 40a-40d are similar to one another, and are appear at four different locations throughout test pattern 18. Similarly, color patches 20ba, 20bb, 20bc and 20bd in regions 40a-40d are similar to one another, and are appear at four different locations throughout test pattern 18, and color patches 20ca, 20cb, 20cc and 20cd in regions 40a-40d are similar to one another, and are appear at four different locations throughout test pattern 18. Persons of ordinary skill in the art will understand that the specific location of each color patch 20 is not important, but similar color patches preferably should be distributed over various parts of output page 16. As described below, similar color patches 20 located within an individual output page 16 are used to determine spatial page color variations.

Figure 4:
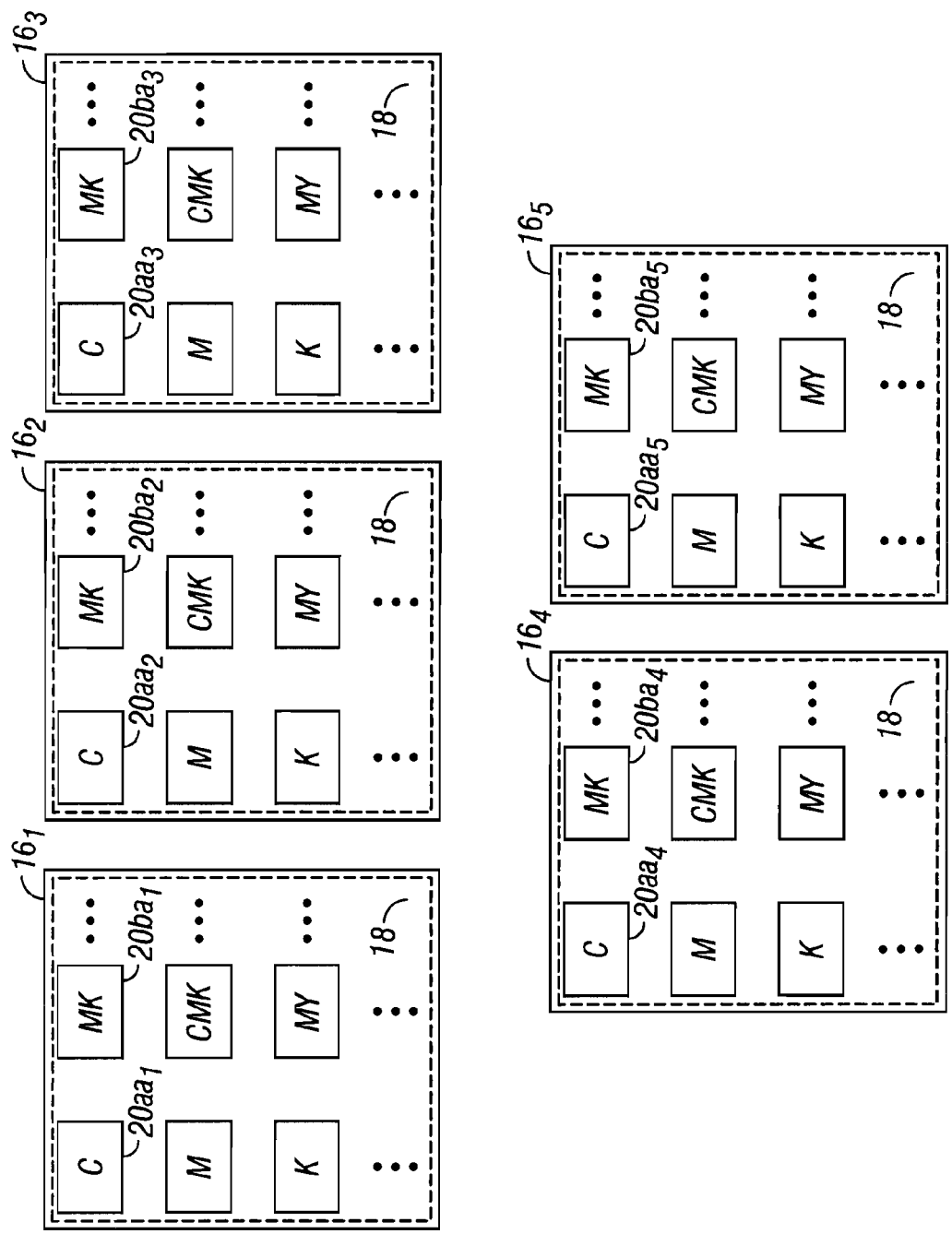
FIG. 4 is a diagram of exemplary output pages for use with systems and methods in accordance with this invention.

Referring now to FIG. 4, an exemplary set of output pages 16 are described. Each of output pages 16₁-16₅ includes test pattern 18 including color patches 20. In particular, output page 16₁, includes color patches 20aa₁ and 20ba₁, output page 16₂ includes color patches 20aa₂ and 20ba₂, output page 16₃ includes color patches 20aa₃ and 20ba₃, output page 16₄ includes color patches 20aa₄ and 20ba₄, and output page 16₅ includes color patches 20aa₅ and 20ba₅. Across the five output pages 16₁-16₅, color patches 20aa₁, 20aa₂, 20aa₃, 20aa₄ and 20aa₅ are similar to one another, and color patches 20ba₁, 20ba₂, 20ba₃, 20ba₄ and 20ba₅ are similar to one another. As described below, similar color patches 20aa¹-20aa₅ and 20ba₁-20ba₅ located across multiple output pages 16₁-16₅ are used to determine page-to-page color variations.

Referring again to FIGS. 1 and 2, at step 34, colorimetric values are determined for each color patch 20 on each output page 16. Thus, for example, measurement device 22 may be used to determine LAB data for each color patch 20 on each of output pages 16₁-16₅ illustrated in FIGS. 3 and 4, for a total of three hundred sets of LAB data (i.e., sixty color patches 20 on each of the five output pages 16₁-16₅). At step 36, the standard deviation of each of the L, a and b values may be determined for sets of similar color patches 20. In particular, for each output page 16, the spatial standard deviation $\sigma L_{spatial}$, $\sigma a_{spatial}$, and $\sigma b_{spatial}$, of each of the L, a and b values, respectively, may be determined for similar color patches 20 within the page:

$$\sigma L_{spatial} = \sqrt{\frac{\sum (L - \bar{L})^2}{N - 1}} \quad (1)$$

$$\sigma a_{spatial} = \sqrt{\frac{\sum (a - \bar{a})^2}{N - 1}} \quad (2)$$

$$\sigma b_{spatial} = \sqrt{\frac{\sum (b - \bar{b})^2}{N - 1}} \quad (3)$$

where $\bar{L}$, $\bar{a}$ and $\bar{b}$ are the average L, a and b values, respectively, in each set, and N is the number of samples per set. For example, referring again to FIG. 3, the spatial standard deviation of each of the L, a and b values may be determined for the set of color patches 20aa-20ad, the set of color patches 20ba-20bd, the set of color patches 20ca-20cd, and so on.

In addition, for output pages 16₁-16₅, the page-to-page standard deviation $\sigma L_{P-P}$, $\sigma a_{P-P}$, and $\sigma b_{P-P}$, of each of the L, a and b values, respectively, may be determined for similar color patches 20 across the pages:

$$\sigma L_{P-P} = \sqrt{\frac{\sum (L - \bar{L})^2}{N - 1}} \quad (4)$$

$$\sigma a_{P-P} = \sqrt{\frac{\sum (a - \bar{a})^2}{N - 1}} \quad (5)$$

$$\sigma b_{P-P} = \sqrt{\frac{\sum (b - \bar{b})^2}{N - 1}} \quad (6)$$

where $\bar{L}$, $\bar{a}$ and $\bar{b}$ are the average L, a and b values, respectively, in each set, and N is the number of samples per set. For example, referring again to FIG. 4, the page-to-page standard deviation of each of the L, a and b values may be determined for the set of color patches 20aa₁-20aa₅, the set of color patches 20ba₁-20ba₅, and so on.

Referring again to FIG. 2, at step 38, a numerical value is calculated that is a function of the standard deviation values and that represents a colorimetric characterization of the color deviation of a set of similar color values. For example, a formula based on Euclidean distance calculations may be used. In particular, for each output page 16, a numerical value $E_{spatial}$ that represents the spatial color deviation within the page may be determined for similar color patches 20 based on the corresponding standard deviation values calculated in step 36:

$$E_{spatial} = \sqrt{\sigma L_{spatial}^2 + \sigma a_{spatial}^2 + \sigma b_{spatial}^2} \quad (7)$$

In addition, for output pages 16₁-16₅, a numerical value $E_{P-P}$ that represents the page-to-page color deviation across the pages may be determined for similar color patches 20 across the pages based on the corresponding standard deviation values calculated in step 36:

$$E_{P-P} = \sqrt{\sigma L_{P-P}^2 + \sigma a_{P-P}^2 + \sigma b_{P-P}^2} \quad (8)$$

The following table illustrates exemplary $E_{spatial}$ and $E_{P-P}$ values for four color patches 20a per output page 16, across five output pages 16₁-16₅, where each sample patch 20a has colorant values 100% C, 0% M, 0% Y and 0% K:

| Page | Sample | L | a | b |
|---|---|---|---|---|
| 1 | 20aa₁ | 47.53 | −31.07 | −55.4 |
| 1 | 20ab₁ | 48.12 | −31.09 | −55.3 |
| 1 | 20ac₁ | 44.17 | −27.24 | −57.09 |
| 1 | 20ad₁ | 47.72 | −31.19 | −55.33 |
| 2 | 20aa₂ | 47.72 | −30.5 | −54.84 |
| 2 | 20ab₂ | 47.56 | −30.58 | −55.37 |
| 2 | 20ac₂ | 43.17 | −25.81 | −57.34 |
| 2 | 20ad₂ | 45.98 | −29.76 | −55.97 |
| 3 | 20aa₃ | 46.95 | −29.95 | −55.35 |
| 3 | 20ab₃ | 47.41 | −29.8 | −55.49 |
| 3 | 20ac₃ | 43.57 | −25.67 | −57.11 |
| 3 | 20ad₃ | 45.24 | −28.43 | −56.51 |
| 4 | 20aa₄ | 48.21 | −30.2 | −55.13 |
| 4 | 20ab₄ | 48.31 | −29.73 | −55.32 |
| 4 | 20ac₄ | 44.38 | −25.8 | −56.86 |
| 4 | 20ad₄ | 46.82 | −29.12 | −55.82 |
| 5 | 20aa₅ | 47.19 | −32.07 | −55.07 |
| 5 | 20ab₅ | 48.02 | −32.27 | −55.28 |
| 5 | 20ac₅ | 43.66 | −27.39 | −57.24 |
| 5 | 20ad₅ | 45.03 | −29.38 | −56.64 |

Based on these exemplary values, and using equations (1)-(3) and (7), the spatial color deviation $E_{spatial}$ for each page is:

| Page | $E_{spatial}$ |
|---|---|
| 1 | 2.971285 |
| 2 | 3.24904 |
| 3 | 2.735232 |
| 4 | 2.808842 |
| 5 | 3.169704 |

In addition, using equations (4)-(6) and (8), the page-to-page color deviation $E_{P-P}$ for each patch location is:

| Patch Location | $E_{P-P}$ |
|---|---|
| a | 1.00057 |
| b | 1.117555 |
| c | 0.999795 |
| d | 1.609404 |

Persons of ordinary skill in the art will understand that the spatial color deviation $E_{spatial}$ values determined across multiple pages may be averaged to provide an average spatial color deviation, and that the page-to-page color deviation $E_{P-P}$ values determined across multiple patch locations may be averaged to provide an average page-to-page color deviation. Persons of ordinary skill in the art also will understand that other functions of may be used to characterize the color deviation of a set of similar color values. For example, functions based on CMC color deviation formulae or other similar color difference formulae may be used.

Figure 5:
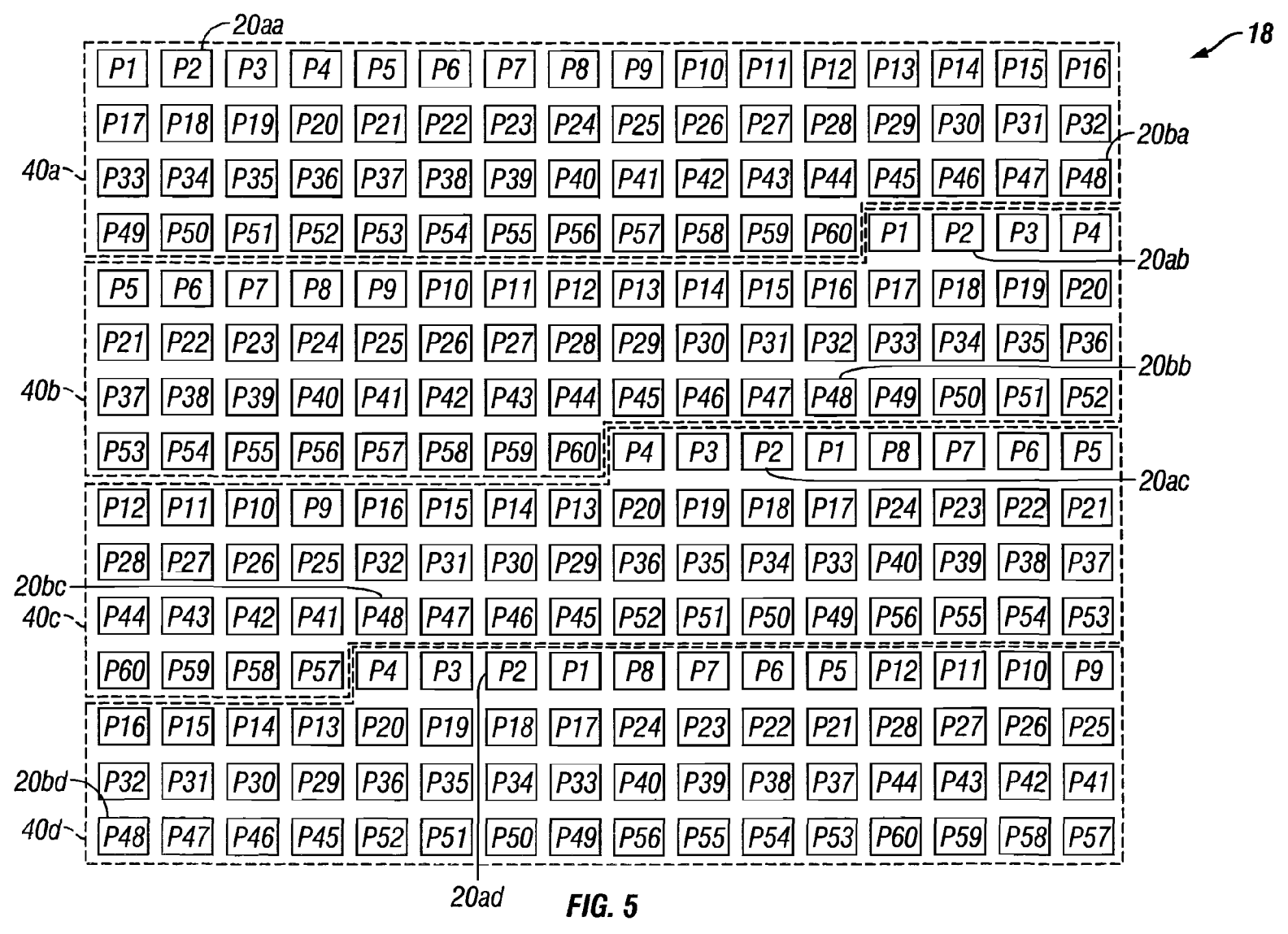

In addition, persons of ordinary skill in the art will understand that test pattern 18 may include more than four regions 40a-40d, and each region may include more than fifteen color patches 20. For example, FIG. 5 illustrates an alternative exemplary test pattern 18 that each includes four regions 40a-40d, with each region including sixty color patches P1-P60. Exemplary colorant values (specified in percent) for each patch are illustrated in the following table:

| Patch | C | M | Y | K |
|---|---|---|---|---|
| P1 | 25 | 0 | 0 | 0 |
| P2 | 50 | 0 | 0 | 0 |
| P3 | 75 | 0 | 0 | 0 |
| P4 | 100 | 0 | 0 | 0 |
| P5 | 0 | 25 | 0 | 25 |
| P6 | 0 | 50 | 0 | 50 |
| P7 | 0 | 75 | 0 | 75 |
| P8 | 0 | 100 | 0 | 100 |
| P9 | 25 | 25 | 25 | 0 |
| P10 | 50 | 50 | 50 | 0 |
| P11 | 75 | 75 | 75 | 0 |
| P12 | 100 | 100 | 100 | 0 |
| P13 | 0 | 0 | 25 | 25 |
| P14 | 0 | 0 | 50 | 50 |
| P15 | 0 | 0 | 75 | 75 |
| P16 | 0 | 0 | 100 | 100 |
| P17 | 0 | 25 | 0 | 0 |
| P18 | 0 | 50 | 0 | 0 |
| P19 | 0 | 75 | 0 | 0 |
| P20 | 0 | 100 | 0 | 0 |
| P21 | 25 | 25 | 0 | 25 |
| P22 | 50 | 50 | 0 | 50 |
| P23 | 75 | 75 | 0 | 75 |
| P24 | 100 | 100 | 0 | 100 |
| P25 | 25 | 0 | 25 | 25 |
| P26 | 50 | 0 | 50 | 50 |
| P27 | 75 | 0 | 75 | 75 |
| P28 | 100 | 0 | 100 | 100 |
| P29 | 0 | 0 | 25 | 0 |
| P30 | 0 | 0 | 50 | 0 |
| P31 | 0 | 0 | 75 | 0 |
| P32 | 0 | 0 | 100 | 0 |
| P33 | 0 | 0 | 0 | 25 |
| P34 | 0 | 0 | 0 | 50 |
| P35 | 0 | 0 | 0 | 75 |
| P36 | 0 | 0 | 0 | 100 |
| P37 | 0 | 25 | 25 | 0 |
| P38 | 0 | 50 | 50 | 0 |
| P39 | 0 | 75 | 75 | 0 |
| P40 | 0 | 100 | 100 | 0 |
| P41 | 25 | 0 | 25 | 0 |
| P42 | 50 | 0 | 50 | 0 |
| P43 | 75 | 0 | 75 | 0 |
| P44 | 100 | 0 | 100 | 0 |
| P45 | 25 | 25 | 25 | 25 |
| P46 | 50 | 50 | 50 | 50 |
| P47 | 75 | 75 | 75 | 75 |
| P48 | 100 | 100 | 100 | 100 |
| P49 | 25 | 0 | 0 | 25 |
| P50 | 50 | 0 | 0 | 50 |
| P51 | 75 | 0 | 0 | 75 |
| P52 | 100 | 0 | 0 | 100 |
| P53 | 25 | 25 | 0 | 0 |
| P54 | 50 | 50 | 0 | 0 |
| P55 | 75 | 75 | 0 | 0 |

-continued

| Patch | C | M | Y | K |
|---|---|---|---|---|
| P56 | 100 | 100 | 0 | 0 |
| P57 | 0 | 25 | 25 | 25 |
| P58 | 0 | 50 | 50 | 50 |
| P59 | 0 | 75 | 75 | 75 |
| P60 | 0 | 100 | 100 | 100 |

As previously mentioned, persons of ordinary skill in the art will understand that the specific location of each color patch 20 is not important, but similar color patches preferably should be distributed over various parts of output page 16.

The foregoing merely illustrates the principles of this invention, and various modifications can be made by persons of ordinary skill in the art without departing from the scope and spirit of this invention.

The invention claimed is:

1. A method for characterizing a color variation of a color output device, the method comprising:
   printing a set of similar color patches using the color output device;
   determining colorimetric values for each color patch;
   calculating a standard deviation value for each of the colorimetric values;
   calculating a numerical value that is a function of the standard deviation values and that represents a colorimetric deviation of the set;
   characterizing the color variation of the color output device based on the calculated numerical value; and
   outputting a signal representative of the characterized color variation.

2. The method of claim 1, wherein the color output device is a color printer.

3. The method of claim 1, wherein the color output device is a color copier.

4. The method of claim 1, wherein the color output device is a color printing press.

5. The method of claim 1, wherein the color patches comprise predetermined percentages of cyan, magenta, yellow and black colorants.

6. The method of claim 1, wherein printing further comprises printing the set of similar color patches on an output page.

7. The method of claim 1, wherein printing further comprises printing the set of similar color patches on a plurality of output pages.

8. The method of claim 1, wherein the colorimetric values comprise L, a and b values.

9. The method of claim 1, wherein the colorimetric values comprise X, Y and Z values.

10. The method of claim 1, wherein determining further comprises measuring the color patches using a colorimeter.

11. The method of claim 1, wherein determining further comprises measuring the color patches using a spectrophotometer.

12. The method of claim 1, wherein determining further comprises measuring the color patches using a spectrocolorimeter.

13. The method of claim 1, wherein the function comprises a sum of squares of the standard deviation values.

14. The method of claim 1, wherein the function comprises a square root of a sum of squares of the standard deviation values.

15. A system for characterizing color variations in a color output device, the system comprising:
   an image file comprising a set of similar color patches, the image file adapted to be printed on the color output device;
   a means for determining colorimetric values for each printed color patch; and
   a means for calculating a standard deviation value for each of the colorimetric values, and a numerical value that is a function of the standard deviation values and that represents a colorimetric characterization of color deviation of the set.

16. The system of claim 15, wherein the color output device is a color printer.

17. The system of claim 15, wherein the color output device is a color copier.

18. The system of claim 15, wherein the color output device is a color printing press.

19. The system of claim 15, wherein the color patches comprise predetermined percentages of cyan, magenta, yellow and black colorants.

20. The system of claim 15, wherein the set of similar color patches are printed on an output page.

21. The system of claim 15, wherein the set of similar color patches are printed on a plurality of output pages.

22. The system of claim 15, wherein the colorimetric values comprise L, a and b values.

23. The system of claim 15, wherein the colorimetric values comprise X, Y and Z values.

24. The system of claim 15, wherein the measuring device comprises a colorimeter.

25. The system of claim 15, wherein the measuring device comprises a spectrophotometer.

26. The system of claim 15, wherein the measuring device comprises a spectrocolorimeter.

27. The system of claim 15, wherein the function comprises a sum of squares of the standard deviation values.

28. The system of claim 15, wherein the function comprises a square root of a sum of squares of the standard deviation values.

* * * * *